US009346950B2

(12) United States Patent
Imada

(10) Patent No.: US 9,346,950 B2
(45) Date of Patent: May 24, 2016

(54) RESIN COMPOSITION, RESIN MOLDED ARTICLE, AND SURFACE-TREATED RED PHOSPHORUS

(71) Applicant: FUJI XEROX CO., LTD., Tokyo (JP)

(72) Inventor: Akira Imada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 211 days.

(21) Appl. No.: 14/057,558

(22) Filed: Oct. 18, 2013

(65) Prior Publication Data

US 2014/0288210 A1 Sep. 25, 2014

(30) Foreign Application Priority Data

Mar. 25, 2013 (JP) ................................ 2013-061766
May 28, 2013 (JP) ................................ 2013-111985

(51) Int. Cl.

| | |
|---|---|
| ***C08K 9/00*** | (2006.01) |
| ***C08L 69/00*** | (2006.01) |
| ***C08L 67/04*** | (2006.01) |
| ***C08K 9/04*** | (2006.01) |
| ***C08K 9/06*** | (2006.01) |

(52) U.S. Cl.

CPC . *C08L 69/00* (2013.01); *C08K 9/04* (2013.01); *C08K 9/06* (2013.01); *C08L 67/04* (2013.01); *Y10T 428/2982* (2015.01)

(58) Field of Classification Search

CPC ................................ C08L 69/00; C08L 67/04
USPC .......................................... 523/205; 252/609
See application file for complete search history.

(56) References Cited

U.S. PATENT DOCUMENTS

| | | | | |
|---|---|---|---|---|
| 6,248,820 | B1 * | 6/2001 | Nozaki et al. | 524/414 |
| 6,448,316 | B1 * | 9/2002 | Hirano et al. | 524/127 |
| 2005/0154148 | A1 * | 7/2005 | Nakamichi et al. | 525/450 |
| 2007/0208114 | A1 * | 9/2007 | Mawatari et al. | 524/100 |
| 2010/0174017 | A1 * | 7/2010 | Tobita et al. | 524/192 |
| 2013/0048163 | A1 * | 2/2013 | Hafner et al. | 149/6 |

FOREIGN PATENT DOCUMENTS

| | | |
|---|---|---|
| JP | A-2007-321096 | 12/2007 |
| JP | A-2011-1511 | 1/2011 |
| JP | A-2011-168756 | 9/2011 |

* cited by examiner

*Primary Examiner* — Hannah Pak
(74) *Attorney, Agent, or Firm* — Oliff PLC

(57) ABSTRACT

A resin composition includes a resin selected from a polylactic acid resin and a polycarbonate resin as a matrix resin, and surface-treated red phosphorus, wherein the surface-treated red phosphorus is contained in an amount of 10 parts by weight to 40 parts by weight, based on 100 parts by weight of the polylactic acid resin or the polycarbonate resin.

14 Claims, No Drawings

RESIN COMPOSITION, RESIN MOLDED ARTICLE, AND SURFACE-TREATED RED PHOSPHORUS

CROSS-REFERENCE TO RELATED APPLICATIONS

This application is based on and claims priority under 35 USC 119 from Japanese Patent Application Nos. 2013-61766 filed Mar. 25, 2013 and 2013-111985 filed May 28, 2013.

BACKGROUND

1. Technical Field

The present invention relates to a resin composition, a resin molded article, and surface-treated red phosphorus.

2. Related Art

Heretofore, a polymer material such as a polystyrene, a polystyrene-ABS resin copolymer, a polycarbonate, a polyester, a polyphenylene sulfide, and a polyacetal has been used for parts of electric products, and electronic and electric equipment since it is excellent in heat resistance, mechanical strength, and the like, and in particular, in the retainability of the mechanical strength against circumstantial changes in a case of the parts of the electronic and electric equipment.

Furthermore, in recent years, a resin composition including a polylactic acid resin that is one kind of biodecomposable polymer, and a molded article obtained using the resin composition are known, from the viewpoints of environmental issues or the like.

SUMMARY

According to an aspect of the invention, there is provided a resin composition including a resin selected from a polylactic acid resin and a polycarbonate resin as a matrix resin, and surface-treated red phosphorus, wherein the surface-treated red phosphorus is contained in an amount of 10 parts by weight to 40 parts by weight, based on 100 parts by weight of the polylactic acid resin or the polycarbonate resin.

DETAILED DESCRIPTION

Hereinbelow, the exemplary embodiment of the present invention will be described. The present exemplary embodiment is an example for carrying out the present invention, and the present invention is not limited to the present exemplary embodiment.

The resin composition according to the present exemplary of present invention includes a polylactic acid resin or a polycarbonate resin as a matrix resin, and surface-treated red phosphorus, in which the surface-treated red phosphorus is contained in an amount of 10 parts by weight to 40 parts by weight, based on 100 parts by weight of the polylactic acid resin or the polycarbonate resin. Since the resin composition according to the present exemplary embodiment includes a specific amount of the surface-treated red phosphorus as a flame retardant, in addition to the polylactic acid resin or the polycarbonate resin as a matrix resin, it is used as a master batch of the flame retardant, and in the case of forming a molded article with the addition of other resins or materials, the flame retardancy, the heat resistance, the hydrolysis resistance are excellent. The matrix resin as used herein refers to a target resin containing various additives such as the surface-treated red phosphorus and the flame retardant.

Here, the master batch means a batch in which additives are blended into one or plural kinds of resins constituting a resin molded article, and a case where the additive is a flame retardant is also referred to as a master batch of the flame retardant.

As the polylactic acid resin, the polycarbonate resin, and the surface-treated red phosphorus, the resins as described later are used. Further, the surface-treated red phosphorus contained with respect to 100 parts by weight of the polylactic acid resin or the polycarbonate resin is preferably in an amount of 10 parts by weight to 40 parts by weight, and more preferably 12.5 parts by weight to 33.3 parts by weight.

The resin composition according to the present exemplary embodiment of the present invention contains a polylactic acid resin, a polycarbonate resin, and a styrene resin as a matrix resin, and a hydrolysis inhibitor. When the resin composition according to the present exemplary embodiment further contains the surface-treated red phosphorus as a flame retardant, in addition to the polylactic acid resin, the polycarbonate resin, and the styrene resin as a matrix resin, and the hydrolysis inhibitor, the flame retardancy, the heat resistance, and the hydrolysis resistance are excellent in the case of forming a molded article. As the polylactic acid resin, the polycarbonate resin, the styrene resin, the hydrolysis inhibitor, and the surface-treated red phosphorus, those which will be described later are used.

Red phosphorus is known as a flame retardant, but even when a hydrolysis inhibitor is used for a resin composition including the red phosphorus in the case of forming a molded article, there have been cases where the hydrolysis resistance is deteriorated. This is thought to be due to the fact that phosphoric acid is generated by the hydrolysis, thereby promoting the decomposition of the polylactic acid resin or the like. The present inventors have found that by using a surface-treated red phosphorus as a flame retardant of the resin composition, the flame retardancy, the heat resistance, and the hydrolysis resistance are excellent in the case of forming a molded article. This is thought to be due to the fact that by treating the surface of the red phosphorus, the generation of phosphoric acid by the hydrolysis is prevented. In addition, the resin composition according to the present exemplary embodiment of the present invention is excellent in the mechanical properties in the case of being used as a master batch, with the addition of other resins or materials, to form a molded article.

Polylactic Acid Resin

The polylactic acid resin is derived from plants and has an effect of decreasing environmental loads, specifically, for example, decreasing the amount of $CO_2$ to be emitted and decreasing the amount of petroleum to be used. The polylactic acid resin is not particularly limited so long as it is a condensate of lactic acids, and may be a poly-L-lactic acid (hereinafter also referred to as "PLLA"), a poly-D-lactic acid (hereinafter also referred to as "PDLA"), a mixture of PLLA and PDLA obtained by copolymerization or blending thereof. Further, the polylactic acid resin may be a stereo-complex type polylactic acid which is a mixture of poly-L-lactic acid and poly-D-lactic acid and has high heat resistance, in which helical structures thereof are combined (hereinafter also referred to as "SC-PLA").

The component ratio (molar ratio %) of the poly-L-lactic acid to the poly-D-lactic acid in the copolymer or the blend is not particularly limited, but from the viewpoint that the poly-L-lactic acid has a higher reactivity with a polycarbonate/epoxy compound than a poly-D-lactic acid, it is preferable that the ratio of L-lactic acid/D-lactic acid be in the range of 50/50 to 99.99/0.01. If the L-lactic acid/D-lactic acid is less than 50/50, the mechanical properties are sometimes lowered in the case of forming a molded article, whereas if the ratio is more than 99.99/0.01, the cost increases sometimes.

Furthermore, as the polylactic acid resin, synthesized products or commercial products may be used. Examples of the commercial products include "TERRAMAC TE4000", "TERRAMAC TE2000", and "TERRAMAC TE7000", all manufactured by Unitika Ltd., and "INGEO 3251D", "INGEO 3001D", and "INGEO 4032D", all manufactured by NatureWorks LLC. Further, the polylactic acid resins may be used singly or in combination of two or more kinds thereof.

The polylactic acid resin may further contain copolymerization components other than lactic acid, such as ethylene glycol and dibutanol, that are derived from plants. The content of these copolymerization components may be usually from 1 mol % to 50 mol % in the entire monomer components. Further, as the polylactic acid resin, modified ones, for example, a maleic anhydride-modified polylactic acid, an epoxy-modified polylactic acid, an amine-modified polylactic acid, or the like may be used.

The molecular weight of the polylactic acid resin is not particularly limited, but in the present exemplary embodiment, the weight average molecular weight of the polylactic acid resin is preferably in the range of 50,000 to 300,000, and more preferably in the range of 70,000 to 250,000. In the case where the weight average molecular weight of the polylactic acid resin is less than 50,000, the mechanical properties are sometimes lowered in the case of forming a molded article, whereas if the case where the weight average molecular weight of the polylactic acid is more than 300,000, the processibility is sometimes deteriorated.

The glass transition temperature of the polylactic acid resin is not particularly limited, but it is preferably in the range of 100° C. to 250° C., and more preferably in the range of 120° C. to 200° C. If the glass transition temperature of the polylactic acid resin is lower than 100° C., the mechanical properties are sometimes lowered in the case of forming a molded article, whereas if the case where the glass transition temperature of the polylactic acid resin is higher than 250° C., the processibility is sometimes deteriorated.

The polylactic acid resin may contain lactone compounds of cyclic lactones such as butylollactone and 1,6-dioxacyclodecane-2,7-dione, and the like as the impurities sometimes in the preparation. The content of the impurities such as lactone compounds is preferably low, and specifically, the content of the impurities is less than 10% by weight, and more preferably less than 5% by weight, based on the amount of the polylactic acid. If the content of the impurities such as lactone compounds is 10% by weight or more, the lactone compounds and the like are reacted with a polycarbonate/epoxy compound and the like. Thus, the reactivity with a polyamide is lowered, and as a result, the mechanical properties are sometimes lowered in the case of forming a molded article.

Polycarbonate Resin

The polycarbonate resin is obtained by polycondensation of one or plural monomers, and is not particularly limited as long as it is a polymer having at least one carbonate group, but examples thereof include aromatic polycarbonates such as a bisphenol A type polycarbonate, a bisphenol S type polycarbonate, and a biphenyl type polycarbonate.

As the polycarbonate resin, synthesized products or commercial products may be used. Examples of the commercial products include "L-1250Y" and "AD5503", both manufactured by Teijin Chemicals Ltd., "A2200" manufactured by Idemitsu Kosan Co., Ltd., and "IUPILON S2000" (aromatic polycarbonate resin) manufactured by Mitsubishi Engineering-Plastics Corporation. Further, the polycarbonates may be used singly or in combination of two or more kinds thereof.

The molecular weight of the polycarbonate resin is not particularly limited, but in the present exemplary embodiment, the weight average molecular weight of the polycarbonate resin is preferably in the range of 5,000 to 30,000, and more preferably in the range of 10,000 to 25,000. In the case where the weight average molecular weight of the polycarbonate resin is less than 5,000, the processibility is sometimes lowered due to excess fluidity, whereas if the weight average molecular weight of the polycarbonate resin is more than 30,000, the processibility is sometimes lowered due to insufficient fluidity.

The glass transition temperature of the polycarbonate resin is not particularly limited, but it is preferably in the range of 100° C. to 200° C., and more preferably in the range of 120° C. to 180° C. In the case where the glass transition temperature of the polycarbonate resin is lower than 100° C., the heat resistance is sometimes insufficient, whereas if the glass transition temperature of the polycarbonate resin is higher than 200° C., the processibility is sometimes insufficient.

Styrene Resin

Examples of the styrene resin include a GPPS resin (general polystyrene resin) an HIPS resin (impact resistant polystyrene), an SBR resin (styrene butadiene rubber), an ABS resin (acrylonitrile-butadiene rubber-styrene copolymer), an AES resin (acrylonitrile ethylene propylene rubber-styrene copolymer), an AAS resin (acrylonitrile-acrylic rubber-styrene copolymer), an MBS resin (methyl methacrylate-butadiene rubber-styrene copolymer), an AS resin (acrylonitrile-styrene copolymer), and an MS resin (methyl methacrylate-styrene copolymer). Among these, the HIPS resin, the ABS resin, the AS resin, and the like are preferable in light of the compatibility with the polycarbonate resin and the polylactic acid resin.

As the styrene resin, synthesized products or commercial products may be used. Examples of the commercial products include "TOYOLAC 700" (ABS resin) manufactured by Toray Industries, Inc., and "ZFJ5" (ABS resin) manufactured by UMG ABS, Ltd. Further, the styrene resins may be used singly or in combination of two or more kinds thereof.

The molecular weight of the styrene resin is not particularly limited, but in the present exemplary embodiment, the weight average molecular weight of the styrene resin is preferably in the range of 5,000 to 500,000, and more preferably in the range of 10,000 to 400,000. If the weight average molecular weight of the styrene resin is less than 5,000, the processibility is lowered sometimes due to excess fluidity, whereas if the weight average molecular weight of the styrene resin is more than 500,000, the processibility is sometimes lowered due to insufficient fluidity.

The glass transition temperature of the styrene resin is not particularly limited, but it is preferably in the range of 80° C. to 200° C., and more preferably in the range of 90° C. to 180° C. If the glass transition temperature of the styrene resin is lower than 80° C., the heat resistance is sometimes insufficient, whereas if the glass transition temperature of the styrene resin is higher than 200° C., the processibility is sometimes insufficient.

Polycarbonate/Styrene Alloy Resin

As the polycarbonate resin and the styrene resin, an alloy resin formed by the combination of at least one of the polycarbonate resins and at least one of the styrene resins may be used.

As the polycarbonate/styrene alloy resin, synthesized products or commercial products may be used. Examples of the commercial products include "TN7300" (polycarbonate/ABS alloy resin) manufactured by Teijin Chemicals Ltd.

Further, the polycarbonate/styrene alloy resins may be used singly or in combination of two or more kinds thereof.

The molecular weight of the polycarbonate/styrene alloy resin is not particularly limited, but in the present exemplary embodiment, the weight average molecular weight of the polycarbonate/styrene alloy resin is preferably in the range of 5,000 to 300,000, and more preferably in the range of 10,000 to 150,000. In the case where the weight average molecular weight of the polycarbonate/styrene alloy resin is less than 5,000, the processibility is sometimes lowered due to excess fluidity, whereas if the weight average molecular weight of the polycarbonate/styrene alloy resin is more than 300,000, the processibility is sometimes lowered due to insufficient fluidity.

The glass transition temperature of the polycarbonate/styrene alloy resin is not particularly limited, but it is preferably in the range of 80° C. to 200° C., and more preferably in the range of 90° C. to 180° C. If the glass transition temperature of the polycarbonate/styrene alloy resin is lower than 80° C., the heat resistance is sometimes insufficient, whereas if the glass transition temperature of the polycarbonate/styrene alloy resin is higher than 200° C., the processibility is sometimes insufficient.

At least one of the polycarbonate resin and the styrene resin may be a collected resin that is collected from the market. By using the surface-treated red phosphorus as a flame retardant, a collected resin that is collected from the market is effectively used, and the cost is reduced, whereby it is excellent in environmental properties. Particularly, it is preferable to use a polycarbonate/styrene alloy resin that is collected from the market, as the collected resin. Recycling materials formed by alloying the collected resin from the market, such as a polycarbonate/styrene alloy resin, and a polylactic acid resin, are suitably used as a formulation for high flame retardancy and high heat resistance.

Surface-Treated Red Phosphorus

Red phosphorus is a mixture with other allotropes having violet phosphorus as a main component, and the surface-treated red phosphorus used in the present exemplary embodiment is one formed by surface-treating red phosphorus with a compound having an active hydrogen-containing group. The active hydrogen-containing group includes at least one group selected from the group consisting of a hydroxyl group (—OH), an epoxy group, an isocyanate group, an amino group, a mercapto group (—SH), a carboxyl group, a phosphoric acid group, a sulfonic acid group, and a sulfuric acid group, that may be easily bonded to a hydrolysis inhibitor which will be described later. Preferably, the surface-treated red phosphorus is red phosphorus surface-treated with a compound having at least one of an isocyanate group, a mercapto group, a carboxyl group, a phosphoric acid group, a sulfonic acid group, and a sulfuric acid group. Examples of the compound having an active hydrogen-containing group include resins such as a phenolic resin, an epoxy resin, a urea resin, a phenoxy resin, an acrylic resin, a polyimide resin, a polyurethane resin, a polyester resin, a polysulfone resin, a melamine resin, and an alkyd resin, and the phenolic resin is preferable, for example, since it is easily reacted with a hydrolysis inhibitor due to its hydroxyl group and has a strong function to prevent the aggregation among the coated red phosphorus compounds. Examples of the compound having an active hydrogen-containing group include a silane coupling agent and an inorganic compound. Examples of the silane coupling agent include those having the active hydrogen-containing groups. If the surface of the red phosphorus is treated with the silane coupling agent, a functional group containing active hydrogen is oriented outside, and thus, may be easily bonded with a hydrolysis inhibitor. Examples of the inorganic compound include hydroxides of metals and oxides of metals. Examples of the hydroxides of metals and oxides of metals include hydroxides and oxides of Al, Zn, Ti, Co, and the like. Among these, in light of prevention of aggregations among the red phosphorus compounds, the hydroxide of Al is preferable. Example of the surface-treated red phosphorus includes a surface-treated red phosphorus including aluminum hydroxide in the inner layer and a phenolic resin in the outer layer, in which the red phosphorus is treated with aluminum hydroxide and then with the phenolic resin. By incorporating the surface-treated red phosphorus including aluminum hydroxide in the inner layer and the phenolic resin in the outer layer into a resin composition, generation of phosphine from the red phosphorus is prevented, and further, the mechanical strength such as tensile strength and impact strength is excellent in the case of forming a molded article. This is thought to be due to a fact that the surface-treated red phosphorus has high affinity for a polycarbonate resin, and a hydroxyl group of a phenolic resin in the outer layer and a carboxyl group of a polylactic acid resin are reacted through a hydrolysis inhibitor, whereby the interfacial adhesion between the red phosphorus and the resin is improved and the peeling due to impact or the like is prevented, and therefore, the mechanical strength such as tensile strength and impact strength is excellent.

The proportion of the red phosphorus in the surface-treated red phosphorus is not particularly limited, but it is preferably 50% by weight or more, and more preferably 90% by weight or more. If the proportion of the red phosphorus in the surface-treated red phosphorus is less than 50% by weight, the flame retardancy is sometimes deteriorated in the case of forming a molded article. Further, the proportion of the red phosphorus in the surface-treated red phosphorus is adjusted by, for example, adjusting the surface treatment amount with respect to the red phosphorus.

The average particle diameter of the surface-treated red phosphorus is preferably 40 μm or less, more preferably 30 μm or less, even more preferably 15 μm or less, even still more preferably 10 μm or less, and particularly preferably 5 μm or less. If the average particle diameter of the surface-treated red phosphorus is more than 40 μm, the mechanical properties are sometimes deteriorated in the case of forming a molded article.

As the surface-treated red phosphorus, synthesized products or commercial products may be used. Examples of the commercial products include "NOVA EXCEL 140" (proportion of the red phosphorus: 92%, a surface-treated product of a phenolic resin (outer layer) and $Al(OH)_3$ (inner layer)), "NOVA RED 280A" (proportion of the red phosphorus: 50%, a surface-treated product of a phenolic resin (outer layer) and $Al(OH)_3$ (inner layer)), and "NOVA RED 280C" (proportion of the red phosphorus: 32%, a surface-treated product of a phenolic resin (outer layer) and $Al(OH)_3$ (inner layer)), all manufactured by Rin Kagaku Kogyo Co., Ltd. Further, the surface-treated red phosphorus may be used singly or in combination of two or more kinds thereof.

Hydrolysis Inhibitor

In order to prevent the hydrolyzability of the polylactic acid resin and improve the interfacial adhesion between the polylactic acid resin and the red phosphorus, a hydrolysis inhibitor is blended into the polylactic acid resin. The hydrolysis inhibitor used in the present exemplary embodiment refers to a compound having a functional group that reacts with a carboxyl group liberated at the terminal of the polylactic acid resin, and examples thereof include compound having a carbodiimide group, an epoxy group, an isocyanate group, an oxazoline group, an oxazine group, and an aziridine group. Among these, the compounds having a carbodiimide group, an epoxy group, and an oxazoline group, which are excellent in stability and reactivity with a carboxyl group terminal, are preferable.

As the hydrolysis inhibitor, synthesized products or commercial products may be used. Examples of the commercial products of the carbodiimide compound include "STABAXOL I-LF" (aromatic monocarbodiimide compound), and "STABAXOL P" and "STABAXOL P400" (both aromatic polycarbodiimide compounds), all manufactured by Rhein Chemie Rheinau GmbH; and "LA-1", "HMV-8CA", and "HMV-15CA" (all aromatic polycarbodiimide compounds), all manufactured by Nisshinbo Holdings Inc. Examples of the commercial products of the epoxy compound include "P-1900" (polyglycidyl methacrylate having a weight average molecular weight of 70,000) manufactured by Mitsubishi Rayon Co., Ltd.; "LP-2500" (copolymer of glycidyl methacrylate, methacrylate, and styrene) manufactured by Shine Polymer Co., Ltd. Examples of the commercial products of the oxazoline compound include "RPS-1005" (copolymer of styrene and 2-isopropenyl-2-oxazoline) manufactured by Nippon Shokubai Co., Ltd. These may be used singly or in combination of two or more kinds thereof.

It is thought that the action mechanism for the reaction between a hydroxyl group of the phenolic resin and a carboxyl group of the polylactic acid resin in the outer layer through a hydrolysis inhibitor is that in a kneading step of the polylactic acid, red phosphorus, and the hydrolysis inhibitor, a functional group binding to the hydrolysis inhibitor, such as a carbodiimide group and an epoxy group, a carboxyl group at the terminal of the polylactic acid resin, and an active hydrogen-containing group of the red phosphorus surface, such as a hydroxyl group, are bonded to each other through an addition reaction. On the other hand, it is thought that there is almost no case where all of the functional groups of the hydrolysis inhibitor are consumed in the present addition reaction and a majority of the groups remain unreacted. The amount thereof varies depending on the amount of the hydrolysis inhibitor to be added, the kinds and amounts of the functional groups, or the like. It is thought that the ester bonds are cleaved by a hydrolysis reaction of the polylactic acid resin, and the terminal carboxyl groups newly formed are subjected to an addition reaction with the functional groups remaining in the hydrolysis inhibitor, thereby suppressing the reduction in the molecular weight, and thus exhibiting the hydrolysis resistance.

Accordingly, the polylactic acid, the red phosphorus, and the hydrolysis inhibitor may be melt-kneaded together. However, a sufficient effect may also be obtained in the case where the polylactic acid resin and the hydrolysis inhibitor may be melt-kneaded and reacted first, the red phosphorus may be then added thereto, and the mixture is melt-kneaded; or the red phosphorus and the hydrolysis inhibitor may be mixed and reacted, the polylactic acid resin may be added thereto, and the mixture is melt-kneaded.

Thermally Expandable Graphite

The resin composition according to the present exemplary embodiment preferably further includes thermally expandable graphite as a flame retardant auxiliary. The thermally expandable graphite is formed by subjecting natural graphite to an intercalation compound treatment, and is thus easily expandable thermally. The thermally expandable graphite expands by the intercalation compound decomposition by heating, and foaming. By incorporating the thermally expandable graphite into the resin composition, the flame retardancy is improved in the case of forming a molded article. This is thought to be due to the fact that the thermally expandable graphite which has expanded by heating causes an insulation reaction and is less likely to burn.

Examples of the intercalation compound include inorganic acids such as concentrated sulfuric acid, nitric acid, and selenic acid, and strong oxidizing agents such as concentrated nitric acid, perchloric acid, perchlorate, permanganate, dichromate, and hydrogen peroxide.

The degree of expansion of the thermally expandable graphite at 1000° C. is preferably more than 80 cc/g, more preferably 150 cc/g or more, and even more preferably 200 cc/g or more. If the degree of expansion of the thermally expandable graphite at 1000° C. is less than 80 cc/g, the flame retardancy is sometimes deteriorated in the case of forming a molded article.

The expansion starting temperature of the thermally expandable graphite is preferably 230° C. or higher, more preferably 240° C. or higher, and even more preferably 260° C. or higher. If the expansion starting temperature of the thermally expandable graphite is lower than 230° C., the heating (the heating temperature being usually from about 190° C. to 220° C.) during the kneading of the raw material mixture in the preparation of the resin composition causes foaming, and the flame retardancy is sometimes deteriorated in the case of forming a molded article.

As the thermally expandable graphite, synthesized products or commercial products may be used. Examples of the commercial products include "MZ-260" (expansion starting temperature of 260° C., degree of expansion of 215 cc/g), "MZ-600" (expansion starting temperature of 230° C., degree of expansion of 80 cc/g), and "SS-3N" (expansion starting temperature of 200° C., degree of expansion of 230 cc/g), all manufactured by Air Water Inc. Further, the thermally expandable graphite may be used singly or in combination of two or more kinds thereof.

Content of Each Component

The contents of the polylactic acid resin, the polycarbonate resin, and the styrene resin are not particularly limited, but preferably, the content of the polylactic acid resin is in the range of 5% by weight to 90% by weight, the content of the polycarbonate resin is in the range of 5% by weight to less than 90% by weight, and the content of the styrene resin is in the range of 1% by weight to less than 70% by weight, based on the total amount of solid contents of the resin composition. If the content of the polylactic acid is less than 50% by weight, the total content of the polycarbonate and the styrene resin is 50% by weight or more, a molded article having a balance among the biomass degree, the impact resistance, and the tensile elastic modulus is obtained in the case of forming a molded article. Here, the biomass degree is an index indicating how much a biomass resource that is an organic resource having a biological origin such as plants is contained, and a biomass degree of 25% by weight or more is generally preferable. In the present exemplary embodiment, the content of the polylactic acid in the resin composition or the resin molded article may also be referred to a biomass degree.

The content of the surface-treated red phosphorus is preferably in the range of 1% by weight to 20% by weight, and more preferably in the range of 1.5% by weight to 15% by weight, based on the total amount of the polylactic acid resin, the polycarbonate resin, and the styrene resin. If the content of the surface-treated red phosphorus is less than 1% by weight, the flame retardancy is sometimes insufficient, whereas if the content is more than 20% by weight, the impact resistance is sometimes lowered.

The content of the hydrolysis inhibitor is preferably in the range of 0.1% by weight to 5% by weight, and more preferably in the range of 0.3% by weight to 3% by weight, based on the total amount of the polylactic acid resin, the polycarbonate resin, and the styrene resin. If the content of the hydrolysis inhibitor is less than 0.1% by weight, the adhesion between the red phosphorus and the resin is sometimes insufficient, whereas if the content is more than 5% by weight, a molding failure accompanied by an increase in the melt viscosity of the resin occurs sometimes.

The content of the thermally expandable graphite is preferably in the range of 0% by weight to 20% by weight, more preferably in the range of 1% by weight to 20% by weight, and even more preferably in the range of 2% by weight to 10% by weight, based on the total amount of the polylactic acid resin, the polycarbonate resin, and the styrene resin. If the content of the thermally expandable graphite is more than 20% by weight, the impact resistance is sometimes lowered.

Various Measurement Methods

The content of the polylactic acid resin, the polycarbonate resin, and the styrene resin in the resin composition is measured by $^{1}$H-NMR analysis. The content of the impurities such as lactone compounds included in the polylactic acid in the resin composition is measured by the same method. The content of the polylactic acid resin, the polycarbonate resin, and the styrene resin in the resin molded article obtained using the resin composition is measured by $^{1}$H-NMR analysis. From the content of the polylactic acid resin, the polycarbonate resin, and the styrene resin in the resin molded article thus measured, the content of the polylactic acid resin, the polycarbonate resin, and the styrene resin in the resin composition are estimated.

The weight average molecular weight of the polylactic acid resin, the polycarbonate resin, and the styrene resin in the resin composition is determined by dissolving a polymer in a solvent, and using the solution by means of size exclusion chromatography (GPC). The compounds are dissolved in tetrahydrofuran (THF) and analyzed by molecular weight distribution measurement (GPC). The weight average molecular weight of the polylactic acid resin, the polycarbonate resin, and the styrene resin in the resin molded article obtained using the resin composition is determined by dissolving a polymer in a solvent, and using the solution by means of size exclusion chromatography (GPC). The compounds are dissolved in tetrahydrofuran (THF) and analyzed by molecular weight distribution measurement (GPC).

The glass transition temperature of the polylactic acid resin, the polycarbonate resin, and the styrene resin in the resin composition is measured by a method of JIS K 7121 using a thermal analyzer (DSC6000 type, manufactured by SII NanoTechnology Inc.). The glass transition temperature of the polylactic acid resin, the polycarbonate resin, and the styrene resin in the resin molded article obtained using the resin composition is measured by a method of JIS K 7121 using a thermal analyzer (DSC6000 type, manufactured by SII NanoTechnology Inc.).

The content of the surface-treated red phosphorus in the resin composition is measured by a method for pyrolysis gas chromatography/mass spectrometry. The content of the surface-treated red phosphorus in the resin molded article obtained using the resin composition is also measured by the same method.

Identification of the reaction of an active hydrogen-containing group such as a hydroxyl group on the surface of red phosphorus with a functional group of the hydrolysis inhibitor, and the reaction of the polylactic acid resin with a functional group of the hydrolysis inhibitor are measured by NMR or IR.

The content of the thermally expandable graphite in the resin composition is measured by a method in which organic materials in a sample are removed by burning at a high temperature and the weight of the residues is taken as a proportion of the thermally expandable graphite. The content of the thermally expandable graphite in the resin molded article obtained using the resin composition is also measured by the same method.

The proportion of the red phosphorus of the surface-treated red phosphorus in the resin composition is measured by colorimetric analysis. The proportion of the red phosphorus of the surface-treated red phosphorus in the resin molded article obtained using the resin composition is measured by SEM-EDX.

The average particle diameter of the surface-treated red phosphorus in the resin composition is measured by a laser Raman spectrometer LabRAM ARAMIS manufactured by HORIBA, Ltd. at a laser wavelength of 633 nm. As for the average particle diameter, a circle-equivalent diameter is measured by an image treatment by Raman chemical imaging of the component distributions by main component analysis, which is one of multivariate analysis, and the average value of the number average particle diameters D50 of the five particles is determined as the average particle diameter. The average particle diameter of the surface-treated red phosphorus in the resin molded article is also measured by the same method.

The degree of expansion at 1000° C. and the expansion starting temperature of the thermally expandable graphite in the resin composition are determined by measuring a capacity per gram (cc/g) when a collected expandable graphite obtained by subjecting a sample to dissolution reprecipitation with chloroform as a solvent is heated at 1000° C. for 10 seconds. The degree of expansion at 1000° C. and the expansion starting temperature of the thermally expandable graphite in the resin molded article obtained using the resin composition is also measured by the same method.

Other Components

The resin composition according to the present exemplary embodiment may further include other components including, for example, additives such as an antioxidant, a reinforcing agent, and a weathering agent, and a catalyst, as desired. The content of the other components those described above is based on the total solid content of the resin composition, and each of the contents is preferably 10% by weight or less.

Method for Preparing Resin Composition

The resin composition according to the present exemplary embodiment may be prepared, for example, by kneading a polylactic acid resin, a polycarbonate resin, a styrene resin, a hydrolysis inhibitor, and a surface-treated red phosphorus, and as desired, a thermally expandable graphite and other components; or by kneading a polylactic acid resin and/or a polycarbonate resin, and a surface-treated red phosphorus, and as desired, a styrene resin, a hydrolysis inhibitor, a thermally expandable graphite, and other components.

Kneading may be carried out using a known kneading device such as, for example, a twin-screw kneading device (TEM58SS, manufactured by Toshiba Machine Co., Ltd.), and a simple kneading device (LABOPLASTOMILL, manufactured by Toyo Seiki Seisaku-sho, Ltd.). Here, the temperature conditions for kneading (cylinder temperature conditions) are preferably, for example, in the range of 170° C. to 220° C., more preferably in the range of 180° C. to 220° C., and even more preferably in the range of 190° C. to 220° C. Thus, a molded article having excellent impact resistance and tensile elastic modulus may be easily obtained.

Resin Molded Article

The resin molded article according to the present exemplary embodiment is obtained by molding the above-described resin composition according to the present exemplary embodiment. For example, by a molding method such as injection molding, extrusion molding, blow molding, and thermal press molding, the resin composition according to the present exemplary embodiment is molded to obtain the resin molded article according to the present exemplary embodiment. For the reasons of the productivity or the like, the resin molded article according to the present exemplary embodiment is preferably obtained by injection molding the resin composition according to the present exemplary embodiment.

The injection molding may be carried out using a commercially available device such as, for example, "NEX150" manufactured by Nissei Plastic Industrial Co., Ltd., "NEX70000" manufactured by Nissei Plastic Industrial Co., Ltd., and "SE50D" manufactured by Toshiba Machine Co., Ltd. At this point, the cylinder temperature is preferably in the range of 170° C. to 250° C., and more preferably in the range of 180° C. to 240° C. from the viewpoints of prevention of the decomposition of resins. Further, the mold temperature is preferably in the range of 30° C. to 100° C., and more preferably in the range of 30° C. to 60° C., from the viewpoint of the productivity or the like.

The resin molded article according to the present exemplary embodiment is excellent in flame retardancy such as thin flame retardancy, heat resistance, and hydrolysis resistance. Further, the resin molded article according to the present exemplary embodiment is excellent in mechanical properties.

Parts of Electronic and Electric Equipment

The resin molded article according to the present exemplary embodiment is suitably used as an electronic or electric equipment, an electric home appliance, a container, or an automotive interior since it is excellent in mechanical strength (impact resistance, tensile elastic modulus, and the like). More specifically, the resin molded article according to the present exemplary embodiment is suitable for housings of electric home appliances, electronic and electric equipment, and the like, various parts, or the like, wrapping films, storage cases of CD-ROM, DVD, or the like, tablewares, food trays, beverage bottles, drug wrapping materials, and the like. Among them, the resin molded article according to the present exemplary embodiment is particularly suitable as the parts of electronic and electric equipment. The parts of electronic and electric equipment frequently have complex shapes and are heavy products, and thus, are required to have high impact resistance, as compared with a case of not being heavy products. However, according to the resin molded article according to the present exemplary embodiment, these requirements are sufficiently satisfied. The resin molded article according to the present exemplary embodiment is particularly suitable for housings of an image forming device, a copying machine, or the like.

EXAMPLES

Hereinbelow, the present invention will be described in more detail with reference to Examples and Comparative Examples, but the present invention is not limited to the following Examples.

Preparation Examples of Red Phosphorus Surface-Treated with Melamine Coating

Preparation Example 1

Preparation Example of Red Phosphorus

To a stainless steel conversion kettle equipped with a condenser are put 2000 parts by weight of water, 10000 parts by weight of yellow phosphorus, and 192 parts by weight of a sodium methyl taurate surfactant (manufactured by Lion Corporation, LIPOTAC TEP, a sodium methyl taurate content of 26% by weight), and the conversion kettle is heated while putting a nitrogen gas thereinto. After distilling off the moisture at 100° C., yellow phosphorus is refluxed in a conversion kettle and is continued to be heated for 6 hours at about 270° C. Subsequently, the unconverted yellow phosphorus is distilled at 280° C. to evaporate most of the yellow phosphorus, followed by heating at about 330° C. for 1 hour for the removal of the residual yellow phosphorus, to obtain red phosphorus. The obtained red phosphorus is pulverized in water to afford a red phosphorus slurry. Sodium hydroxide is added to the red phosphorus slurry while stirring, to adjust to pH 12, and heating and stirring are kept for 2 hours, followed by filtering and drying, to obtain about 4000 parts by weight of red phosphorus having an average particle diameter of 5 μM

Surface Treatment Example 1

Surface Treatment with Melamine Resin 500 parts by weight of the red phosphorus obtained in Preparation Example 1 and 10 parts by weight of zinc oxide are suspended in water to afford 2000 parts by weight. 50 parts by weight of melamine, 97 parts by weight of 37% formalin, and 83 parts by weight of sodium carbonate are added thereto, followed by reacting under stirring at 90° C. for 2 hours. After being left to be cooled overnight, the resultant is filtered, washed with water, and dried at 135° C. in a nitrogen gas flow to obtain 500 parts by weight of melamine-coated surface-treated red phosphorus having an average particle diameter of 5.2 μm and a proportion of the red phosphorus of 92% by weight.

Surface Treatment Example 2

Surface Treatment with Epoxy Resin 500 parts by weight of the red phosphorus obtained in Preparation Example 1 are suspended in acetone, and 50 parts by weight of an epoxy resin (EPICLON 840 manufactured by DIC Corporation) and 20 parts by weight of a curing agent (modified aliphatic polyamine, ADEKA HARDENER EH-227 manufactured by ADEKA Corporation) are added thereto to afford 2000 parts by weight. The mixture is warmed to 45° C. while stirring, and a stabilizer (aqueous gelatin solution) is added dropwise thereto, followed by stirring at 75° C. for 2 hours, aging, and then cooling and filtering. The epoxy-coated red phosphorus thus obtained is suspended again in water to afford 3000 parts by weight, and 200 parts by weight of a 30% by weight aqueous sulfuric acid titanium solution is added thereto. The mixture is adjusted to pH 7 with a 24% aqueous sodium hydroxide solution, stirred for 30 minutes, then filtered, washed with water, and dried at 140° C. in a nitrogen gas flow to obtain 565 parts by weight of epoxy resin-coated surface-treated red phosphorus having an average particle diameter of 5.1 μm and a proportion of the red phosphorus of 93% by weight.

Surface Treatment Example 3

Surface Treatment with Urea Resin 60 parts by weight of urea and 60 parts by weight of formaldehyde are condensed at 75° C. in the presence of ammonia to obtain a viscous product in the form of a syrup. This is evaporated in vacuum to adjust the amount of the resin component to 60% by weight, thereby obtaining a condensed urea resin precursor. Thereafter, to 300 parts by weight of the red phosphorus obtained in Preparation Example 1 is added a polyacrylic acid having a solution viscosity of 8,000 mPa·s in the form of a 25% by weight aqueous solution at 25° C. to afford a pH of 3.6 and a concentration of 5% by weight. Further, 1.5 parts by weight (dry) of the concentrated urea resin precursor is mixed therewith at room temperature. Thereafter, the obtained mixture at room temperature is warmed to 55° C. for 20 minutes, a reaction for providing a resin is carried out for 3 hours, and the surface of the red phosphorus is coated with a urea resin, followed by filtering, washing with water, and drying at 140° C. in a nitrogen gas flow, thereby obtaining 295 parts by weight of red phosphorus surface-treated with a urea resin, having an average particle diameter of 5.1 μm and a proportion of the red phosphorus of 93% by weight.

Surface Treatment Example 4

Surface Treatment with Polyurethane Resin 2000 parts by weight of the red phosphorus obtained in Preparation Example 1 is charged to a temperature-controllable tilting pan type tumbling granulator (pan diameter of 520 mm) equipped with a hot-air generator with rotation at 20 RPM to 30 RPM to adjust the temperature to 70° C. to 75° C. 4.7 parts by weight of SUMIDUR 44V10 (manufactured by Sumitomo Bayer Urethane Co., Ltd.) as a coated resin, 5.3 parts by weight of a branched polyether type polyol (manufactured by Sumitomo Bayer Urethane Co., Ltd.), and 0.1 part by weight of 2,4,6-tris(dimethylaminomethyl)phenol as an amine catalyst are stirred, and mixed, and added thereto. The mixture is allowed to undergo a reaction for 50 minutes to obtain 1990 parts by weight of red phosphorus surface-treated with a polyurethane resin, having an average particle diameter of 5.2 μm and a proportion of the red phosphorus of 92% by weight.

Surface Treatment Example 5

Surface Treatment with Unsaturated Polyester Resin 1000 parts by weight of the red phosphorus obtained in Preparation Example 1 is added to 3000 parts by weight of chloroform. 50 parts by weight of an unsaturated polyester (trade name: EPOLAC G-753 PTW, manufactured by Nippon Shokubai Co., Ltd.) is added to this solution, followed by stirring at an ambient temperature for 30 minutes. Then, a solution formed by dissolving 0.5 part by weight of methylethylketone peroxide (trade name, Cat-M, manufactured by Nippon Shokubai Co., Ltd.) as a curing catalyst in 50 parts by weight of chloroform in advance is added thereto, followed by stirring at an ambient temperature for 60 minutes. After completion of the reaction, chloroform is collected by drying under reduced pressure to obtain 960 parts by weight of unsaturated polyester resin-coated surface-treated red phosphorus having an average particle diameter of 5.2 μm and a proportion of the red phosphorus of 95% by weight.

Surface Treatment Example 6

Surface Treatment with Epoxy Group-Containing Silane Coupling Agent 100 parts by weight of the red phosphorus obtained in Preparation Example 1 is stirred for 30 minutes with 5 parts by weight of an epoxy group-containing silane coupling agent (trade name: KBM-402, manufactured by Shin-Etsu Silicones Co., Ltd.) and 100 parts by weight of ethanol, followed by evaporating ethanol under reduced pressure to obtain 96 parts by weight of red phosphorus surface-treated with epoxy group-containing silane coupling agent, having an average particle diameter of 5.1 μm and a proportion of the red phosphorus of 94% by weight.

Surface Treatment Example 7

Surface Treatment with Amino Group-Containing Silane Coupling Agent

The treatment is carried out under the same conditions as in Surface Treatment Example 6 except that an amino group-containing silane coupling agent (trade name: KBM-903, manufactured by Shin-Etsu Silicones Co., Ltd.) is used as a silane coupling agent, 95 parts by weight of red phosphorus surface-treated with an amino group-containing silane coupling agent, having an average particle diameter of 5.1 μm and a proportion of the red phosphorus of 94% by weight is obtained.

Surface Treatment Example 8

Surface Treatment with Mercapto Group-Containing Silane Coupling Agent

The treatment is carried out under the same conditions as in Surface Treatment Example 6 except that a mercapto group-containing silane coupling agent (trade name: KBM-802, manufactured by Shin-Etsu Silicones Co., Ltd.) is used as a silane coupling agent, 97 parts by weight of red phosphorus surface-treated with a mercapto group-containing silane coupling agent, having an average particle diameter of 5.1 μm and a proportion of the red phosphorus of 95% by weight, is obtained.

Surface Treatment Example 9

Surface Treatment with Isocyanate Group-Containing Silane Coupling Agent

The treatment is carried out under the same conditions as in Surface Treatment Example 6 except that an isocyanate group-containing silane coupling agent (trade name: KBE-9007, manufactured by Shin-Etsu Silicones Co., Ltd.) is used as a silane coupling agent, 95 parts by weight of red phosphorus surface-treated with an isocyanate group-containing silane coupling agent having an average particle diameter of 5.1 μm and a proportion of the red phosphorus of 94% by weight, is obtained.

Preparation of Resin Composition and Resin Molded Article

Example 1

In the composition shown in Table 1, a polylactic acid resin (trade name, "INGE04032D", manufactured by Nature-Works LCC.) as a polylactic acid resin (A-1), an aromatic polycarbonate resin (trade name, "IUPILON S2000", manufactured by Mitsubishi Engineering-Plastics Corporation) as a polycarbonate resin (B-1), an acrylonitrile-styrene-butadiene copolymer (trade name, "TOYOLAC 700", manufactured by Toray Industries, Inc.) as a styrene resin (C-1), a surface-treated red phosphorus (microcapsulated red phosphorus, trade name "NOVA EXCEL 140", proportion of the red phosphorus: 92%, manufactured by Rin Kagaku Kogyo Co., Ltd.) as a flame retardant-1 (D-1), and a carbodiimide compound (trade name, "HMV-BCA", manufactured by Nisshinbo Holdings Inc.) as a hydrolysis inhibitor-1 are blended, and mixed as uniformly as possible by a tumbler. The mixture is melt-kneaded with a twin-screw extruder (TEX-30α, manufactured by The Japan Steel Works, Ltd.) equipped with a vent at each of a cylinder temperature and a die temperature of 220° C., a screw rotation number of 240 rpm, a vent suction degree of 100 MPa, and a discharge amount of 10 kg/h to obtain a pellet. The obtained pellet is dried at 80° C. for 4 hours, using a hot-air drier, and then an injection molding machine (product name "NEX500", manufactured by Toshiba Machine Co., Ltd.) is used under the conditions of a cylinder temperature of 230° C. and a mold temperature of 60° C. to obtain a predetermined test piece for evaluation.

Examples 2 to 4, 5-1 to 5-9, 6, 7-1 to 7-2, 8 to 21, and Comparative Examples 1 to 6

With the same procedures as in Example 1 except that in the compositions shown in Tables 1 to 3, 6 to 8, the flame retardants-1 to 4, 5-1 to 5-9, 6 to 9 (D-1 to 4, 5-1 to 5-9, 6 to 9) shown in Tables 4 and 5, the hydrolysis inhibitors-1 to 3, and as desired, thermally expandable graphite as the flame retardant auxiliaries-1 to 3 (E-1 to 3), and as desired, polytetrafluoroethylene (polytetrafluoroethylene (PTFE) content of 50% by weight, trade name "A-3800", manufactured by Mitsubishi Rayon Co., Ltd.) as an anti-dripping agent are used, a test piece for evaluation is obtained.

Preparation of Recycled Resin Composition and Preparation of Resin Molded Article Examples 22 to 24, Comparative Examples 7 to 8, and Reference Examples 1 to 3

In the composition shown in Table 10, any one of the resins 1 to 6 shown in Table 9, the polylactic acid resin (A-1), the surface-treated red phosphorus (D-1) as a flame retardant, or the aromatic condensed phosphoric ester flame retardant (D-7), a thermally expandable graphite (E-1) as a flame retardant auxiliary, the hydrolysis inhibitor-1, and the anti-dripping agent are blended, and mixed as uniformly as possible by a tumbler. The mixture is melt-kneaded with a twin-screw extruder (TEX-30α, manufactured by The Japan Steel Works, Ltd.) equipped with a vent at each of a cylinder temperature and a die temperature of 220° C., a screw rotation number of 250 rpm, a vent suction degree of 100 MPa, and a discharge amount of 10 kg/h to obtain a pellet. The obtained pellet is dried at 80° C. for 4 hours, using a hot-air drier, and then an injection molding machine (product name "NEX500", manufactured by Toshiba Machine Co., Ltd.) is used under the conditions of a cylinder temperature of 220° C. and a mold temperature of 50° C. to obtain a predetermined test piece for evaluation.

As the products collected from the market, covers for copying machines, formed from a PC/ABS alloy resin collected from the market (trade name, "TN7300", manufactured by Teijin Chemicals Ltd.) or an ABS resin (trade name, "ZFJ31", manufactured by UMGABS), or a disc waste material, formed from a PC resin (trade name, "AD5503", manufactured by Teijin Chemicals Ltd.) are collected; the metal parts are removed therefrom; and the resultants are pulverized to a size of about 4 mm by a pulverizer, and used.

Measurement and Evaluation

Flame Retardancy

A V test as defined in UL94 is carried out with a thickness of a test piece of 0.8 mm. Further, as for the parts thereof, a 5VB test as defined in UL94 is carried out with a thickness of a test piece of 1.6 mm. Further, as the results of the burning test, the level is lowered in the order of 5VB, V-0, V-1, V-2, and HB.

Heat Resistance (Thermal Deformation Temperature)

While raising the temperature of the test piece in the state where a load (1.8 MPa) determined by a test method of ASTM D648 is applied, the temperature at which a specified value for the size of the deflection is obtained (load deflection temperature: DTUL) is measured.

Hydrolysis Resistance

A vehicle type pellet is moistened under an atmosphere of 80° C. and 95% RH, for 100 hours and 300 hours, and each of the melt index MVR is measured. The temperature and the load are adjusted to afford an MVR before moistening of 5 $cm^3$/10 min. The amount of variation when the MVR before moistening is set to 100 is evaluated as an index.

Mechanical Properties

Impact Strength

A Charpy impact resistance strength (kJ/$m^2$) is measured in accordance with a method as defined in ISO-179, using an ISO multipurpose dumbbell test piece which is notch-processed, by means of an impact resistance tester (DG-5, manufactured by Toyo Seiki Co., Ltd.).

Tensile Elongation at Break

The tensile elongation (%) at break of the molded article is measured according to JIS K-7113. Further, a test piece of No. JIS1 (4 mm in thick) obtained by an injection molding is used as a molded article.

Yield Stress Tensile Strength

The yield stress tensile strength (MPa) of a molded article is measured according to JIS K-7113.

TABLE 1

| | Composition | Example 1 | Example 2 | Example 3 | Example 4 | Example 5-1 | Example 6 | Example 7-1 |
|---|---|---|---|---|---|---|---|---|
| Composition | Polylactic acid resin (A-1) | 30 | 30 | 30 | 30 | 30 | 30 | 30 |
| | Aromatic polycarbonate resin (B-1) | 55 | 55 | 55 | 55 | 55 | 55 | 55 |
| | ABS resin (C-1) | 15 | 15 | 15 | 15 | 15 | 15 | 15 |
| | Flame retardant-1 (D-1) | 10 | | | | | | 10 |
| | Flame retardant-2 (D-2) | | 10 | | | | | |
| | Flame retardant-3 (D-3) | | | 10 | | | | |
| | Flame retardant-4 (D-4) | | | | 10 | | | |
| | Flame retardant-5 (D-5-1) | | | | | 10 | | |
| | Flame retardant-6 (D-6) | | | | | | 10 | |
| | Flame retardant-7 (D-7) | | | | | | | |
| | Flame retardant-8 (D-8) | | | | | | | |
| | Flame retardant-9 (D-9) | | | | | | | |
| | Hydrolysis inhibitor-1 | 1 | 1 | 1 | 1 | 1 | 1 | |
| | Hydrolysis inhibitor-2 | | | | | | | 1 |
| Evaluation results | | | | | | | | |
| Flame retardancy | UL94 flame retardancy V test (0.8 mm in thickness) | V-2 | V-2 | V-2 | V-2 | V-2 | V-2 | V-2 |
| Heat resistance | DTUL (1.8 MPa) | 102 | 98 | 95 | 105 | 104 | 90 | 98 |
| Hydrolysis resistance evaluation at (80° C., 95%) | | | | | | | | |
| 0 hr | | 100 | 100 | 100 | 100 | 100 | 100 | 100 |
| 100 hr | | 102 | 101 | 101 | 102 | 102 | 103 | 108 |
| 300 hr | | 105 | 103 | 102 | 104 | 105 | 107 | 112 |
| Mechanical properties | Yield stress tensile strength (MPa) | 58 | 56 | 54 | 60 | 60 | 66 | 60 |
| | Tensile elongation (%) at break | 12.2 | 11.6 | 13.1 | 20.5 | 19.8 | 9.0 | 15.0 |
| | Charpy impact resistance strength ($kJ/m^2$) | 12.1 | 11.4 | 10.1 | 16.8 | 17.4 | 6.5 | 14.0 |

TABLE 2

| | Composition | Example 5-2 | Example 5-3 | Example 5-4 | Example 5-5 | Example 5-6 | Example 5-7 | Example 5-8 | Example 5-9 | Example 7-2 |
|---|---|---|---|---|---|---|---|---|---|---|
| Composition | Polylactic acid resin (A-1) | 30 | 30 | 30 | 30 | 30 | 30 | 30 | 30 | 30 |
| | Aromatic polycarbonate resin (B-1) | 55 | 55 | 55 | 55 | 55 | 55 | 55 | 55 | 55 |
| | ABS resin (C-1) | 15 | 15 | 15 | 15 | 15 | 15 | 15 | 15 | 15 |
| | Flame retardant-5 (D-5-2) | 10 | | | | | | | | 10 |
| | Flame retardant-5 (D-5-3) | | 10 | | | | | | | |
| | Flame retardant-5 (D-5-4) | | | 10 | | | | | | |
| | Flame retardant-5 (D-5-5) | | | | 10 | | | | | |
| | Flame retardant-5 (D-5-6) | | | | | 10 | | | | |
| | Flame retardant-5 (D-5-7) | | | | | | 10 | | | |
| | Flame retardant-5 (D-5-8) | | | | | | | 10 | | |
| | Flame retardant-5 (D-5-9) | | | | | | | | 10 | |
| | Hydrolysis inhibitor-1 | 1 | 1 | 1 | 1 | 1 | 1 | 1 | 1 | |
| | Hydrolysis inhibitor-3 | | | | | | | | | 1 |
| Evaluation results | | | | | | | | | | |
| Fame retardancy | UL94 flame retardancy V test (0.8 mm in thickness) | V-2 | V-2 | V-2 | V-2 | V-2 | V-2 | V-2 | V-2 | V-2 |
| Heat resistance | DTUL (1.8 MPa) | 104 | 105 | 104 | 102 | 101 | 100 | 99 | 100 | 99 |
| Hydrolysis resistance evaluation at (80° C., 95%) | | | | | | | | | | |
| 0 hr | | 100 | 100 | 100 | 100 | 100 | 100 | 100 | 100 | 100 |
| 100 hr | | 104 | 107 | 115 | 102 | 115 | 118 | 110 | 121 | 109 |
| 300 hr | | 107 | 119 | 124 | 104 | 128 | 132 | 119 | 139 | 116 |
| Mechanical properties | Yield stress tensile strength (MPa) | 60 | 59 | 58 | 54 | 69 | 68 | 69 | 68 | 60 |
| | Tensile elongation (%) at break | 18.5 | 17.8 | 17.0 | 16.5 | 14.2 | 22.8 | 24.5 | 21.5 | 14.5 |
| | Charpy impact resistance strength ($kJ/m^2$) | 17.0 | 15.8 | 14.2 | 19.4 | 23.2 | 22.5 | 24.1 | 20.5 | 13.2 |

TABLE 3

| | Composition | Comparative Example 1 | Comparative Example 2 | Comparative Example 3 | Comparative Example 4 | Comparative Example 5 | Comparative Example 6 |
|---|---|---|---|---|---|---|---|
| Composition | Polylactic acid resin (A-1) | 30 | 30 | 30 | 30 | 30 | 30 |
| | Aromatic polycarbonate resin (B-1) | 55 | 55 | 55 | 55 | 55 | 55 |
| | ABS resin (C-1) | 15 | 15 | 15 | 15 | 15 | 15 |
| | Flame retardant-1 (D-1) | | | | | | 10 |
| | Flame retardant-2 (D-2) | | | | | | |
| | Flame retardant-3 (D-3) | | | | | | |
| | Flame retardant-4 (D-4) | | | | | | |
| | Flame retardant-5 (D-5) | | | | | | |
| | Flame retardant-6 (D-6) | | | | | | |
| | Flame retardant-7 (D-7) | 10 | 20 | | | | |
| | Flame retardant-8 (D-8) | | | 10 | 20 | | |
| | Flame retardant-9 (D-9) | | | | | 10 | |
| | Hydrolysis inhibitor-1 | 1 | 1 | 1 | 1 | 1 | |
| | Hydrolysis inhibitor-2 | | | | | | |
| Evaluation results | | | | | | | |
| Flame retardancy | UL94 flame retardancy V test (0.8 mm in thickness) | not-V | not-V | not-V | not-V | V-2 | V-2 |
| Heat resistance | DTUL (1.8 MPa) | 84 | 65 | 92 | 90 | 94 | 88 |
| Hydrolysis resistance evaluation at (80° C., 95%) | | | | | | | |
| 0 hr | | 100 | 100 | 100 | 100 | 100 | 100 |
| 100 hr | | 151 | 237 | 214 | 365 | 138 | 245 |
| 300 hr | | 264 | 388 | 415 | 621 | 172 | unmeasurable |
| Mechanical properties | Yield stress tensile strength (MPa) | 52 | 51 | 50 | 48 | 51 | 55 |
| | Tensile elongation (%) at break | 7.1 | 4.2 | 1.8 | 1.2 | 5.1 | 5.0 |
| | Charpy impact resistance strength (kJ/m$^2$) | 4.2 | 3 | 1.5 | 1.2 | 3.2 | 4.8 |

TABLE 4

| | |
|---|---|
| A-1 | INGEO 4032D, manufactured by NatureWorks LLC. |
| B-1 | IUPILON S2000, manufactured by Mitsubishi Engineering-Plastics Corporation |
| C-1 | TOYOLAC 700, manufactured by Toray Industries, Inc. |
| D-1 | NOVA EXCEL 140, proportion of the red phosphorus of 92%, a surface-treated product of a phenolic resin and $Al(OH)_3$, manufactured by Rin Kagaku Kogyo Co., Ltd., average particle diameter of 30 μm |
| D-2 | NOVA RED 280A, proportion of the red phosphorus of 50%, a surface-treated product of a phenolic resin and $Al(OH)_3$, manufactured by Rin Kagaku Kogyo Co., Ltd., average particle diameter of 15 μm |
| D-3 | NOVA RED 280C, proportion of the red phosphorus of 32%, a surface-treated product of a phenolic resin and $Al(OH)_3$, manufactured by Rin Kagaku Kogyo Co., Ltd., average particle diameter of 10 μm |
| D-4 | NOVA EXCEL 140F, proportion of the red phosphorus of 92%, a surface-treated product of a phenolic resin and $Al(OH)_3$, manufactured by Rin Kagaku Kogyo Co., Ltd., average particle diameter of 5 μm |
| D-5-1 | Product surface-treated with a melamine resin, prepared in Surface Treatment Example 1, proportion of the red phosphorus of 92%, average particle diameter of 5.2 μm |
| D-6 | TP-10, proportion of the red phosphorus of 90%, a product surface-treated with titanium oxide, manufactured by Nippon Chemical Industrial Co., Ltd., average particle diameter of 20 μm |
| D-7 | Aromatic condensed phosphoric ester flame retardant, CR-741, phosphorus content of 9%, manufactured by Daihachi Chemical Industry Co., Ltd. |
| D-8 | Ammonium polyphosphate, AP422, phosphorus content of 30%, manufactured by Clariant (Japan) K.K. |
| D-9 | High purity red phosphorus (Not surface-treated) proportion of the red phosphorus of 99% or more, manufactured by RASA Industries, Ltd. |
| E-1 | MZ-260, expansion starting temperature of 260° C., degree of expansion of 215 cc/g, manufactured by Air Water Inc. |
| E-2 | MZ-600, expansion starting temperature of 230° C., degree of expansion of 80 cc/g, manufactured by Air Water Inc. |
| E-3 | SS-3N, expansion starting temperature of 200° C., degree of expansion of 230 cc/g, manufactured by Air Water Inc. |
| Hydrolysis inhibitor-1 | HMV-8CA, polycarbodiimide compound, manufactured by Nisshinbo Chemical Inc. |
| Hydrolysis inhibitor-2 | P-1900, polyglycidyl methacrylate, manufactured by Mitsubishi Rayon Co., Ltd. |
| Anti-dripping agent | A-3800, PTFE content of 50%, manufactured by Mitsubishi Rayon Co., Ltd. |

TABLE 5

| | |
|---|---|
| D-5-2 | Product surface-treated with an epoxy resin, prepared in Surface Treatment Example 2, proportion of the red phosphorus of 93%, average particle diameter of 5.1 μm |
| D-5-3 | Product surface-treated with a urea resin, prepared in Surface Treatment Example 3, proportion of the red phosphorus of 93%, average particle diameter of 5.1 μm |
| D-5-4 | Product surface-treated with a polyurethane resin, prepared in Surface Treatment Example 4, proportion of the red phosphorus of 92%, average particle diameter of 5.2 μm |
| D-5-5 | Product surface-treated with an unsaturated polyester resin, prepared in Surface Treatment Example 5, proportion of the red phosphorus of 95%, average particle diameter of 5.2 μm |
| D-5-6 | Product surface-treated with an epoxy group-containing silane coupling agent, prepared in Surface Treatment Example 6, proportion of the red phosphorus of 94%, average particle diameter of 5.1 μm |
| D-5-7 | Product surface-treated with an amino group-containing silane coupling agent, prepared in Surface Treatment Example 7, proportion of the red phosphorus of 94%, average particle diameter of 5.1 μm |

TABLE 5-continued

| | |
|---|---|
| D-5-8 | Product surface-treated with a mercapto group-containing silane coupling agent, prepared in Surface Treatment Example 8, proportion of the red phosphorus of 95%, average particle diameter of 5.1 μm |
| D-5-9 | Product surface-treated with an isocyanate group-containing silane coupling agent, prepared in Surface Treatment Example 8, proportion of the red phosphorus of 94%, average particle diameter of 5.1 μm |
| Hydrolysis inhibitor-3 | RPS-1005, copolymer of styrene and 2-isopropenyl-2-oxazoline, manufactured by Nippon Shokubai Co., Ltd. |

TABLE 6

| | Composition | Example 8 | Example 9 | Example 10 | Example 11 | Example 12 | Example 13 | Example 14 |
|---|---|---|---|---|---|---|---|---|
| Composition | Polylactic acid resin (A-1) | 10 | 10 | 70 | 70 | 70 | 70 | 70 |
| | Aromatic polycarbonate resin (B-1) | 80 | 50 | 20 | 20 | 20 | 20 | 20 |
| | ABS resin (C-1) | 10 | 40 | 10 | 10 | 10 | 10 | 10 |
| | flame retardant-1 (D-1) | 10 | 10 | 10 | 20 | 1 | 25 | 0.5 |
| | Hydrolysis inhibitor-1 | 1 | 1 | 1 | 1 | 1 | 1 | 1 |
| Evaluation results | | | | | | | | |
| Flame retardancy | UL94 flame retardancy V test (0.8 mm in thickness) | V-1 | V-2 | V-2 | V-2 | V-2 | V-1 | not-V |
| Heat resistance | DTUL (1.8 MPa) | 114 | 102 | 72 | 72 | 73 | 70 | 73 |
| Hydrolysis resistance evaluation at (80° C., 95%) | | | | | | | | |
| 0 hr | | 100 | 100 | 100 | 100 | 100 | 100 | 100 |
| 100 hr | | 101 | 104 | 115 | 115 | 113 | 118 | 112 |
| 300 hr | | 102 | 108 | 124 | 126 | 120 | 130 | 118 |
| Mechanical properties | Yield stress tensile strength (MPa) | 58 | 56 | 54 | 56 | 55 | 52 | 55 |
| | Tensile elongation (%) at break | 12.2 | 11.6 | 13.1 | 7.1 | 14.5 | 4.0 | 14.8 |
| | Charpy impact resistance strength (kJ/m$^2$) | 22.4 | 18.4 | 4.4 | 4.3 | 6.0 | 3.5 | 6.2 |

TABLE 7

| | Composition | Example 15 | Example 16 | Example 17 | Example 18 | Example 19 |
|---|---|---|---|---|---|---|
| Composition | Polylactic acid resin (A-1) | 30 | 30 | 70 | 70 | 70 |
| | Aromatic polycarbonate resin (B-1) | 55 | 55 | 20 | 20 | 20 |
| | ABS resin (C-1) | 15 | 15 | 10 | 10 | 10 |
| | Flame retardant-1 (D-1) | 10 | 10 | 10 | 10 | 10 |
| | Flame retardant auxiliary-1 (E-1) | 5 | 5 | 5 | 20 | 25 |
| | Hydrolysis inhibitor-1 | 1 | 1 | 1 | 1 | 1 |
| | Anti-dripping agent | | 0.8 | 0.8 | 0.8 | 0.8 |
| Evaluation results | | | | | | |
| Flame retardancy | UL94 flame retardancy V test (0.8 mm in thickness) | V-0 | V-0 | V-0 | V-0 | V-0 |
| | UL94 flame retardancy 5VB test (1.6 mm in thickness) | not-5VB | 5VB | 5VB | 5VB | 5VB |
| Heat resistance | DTUL (1.8 MPa) | 105 | 105 | 74 | 73 | 71 |
| Hydrolysis resistance evaluation at (85° C., 95%) | | | | | | |
| 0 hr | | 100 | 100 | 100 | 100 | 100 |
| 100 hr | | 101 | 101 | 106 | 105 | 110 |
| 300 hr | | 102 | 102 | 114 | 119 | 124 |
| Mechanical properties | Yield stress tensile strength (MPa) | 59 | 58 | 56 | 52 | 50 |
| | Tensile elongation (%) at break | 14.5 | 14.7 | 13.7 | 7.0 | 4.9 |
| | Charpy impact resistance strength (kJ/m$^2$) | 14.1 | 16.3 | 6.2 | 5.5 | 4.1 |

TABLE 8

| | Composition | Example 15 | Example 20 | Example 21 |
|---|---|---|---|---|
| Composition | Polylactic acid resin (A-1) | 30 | 30 | 70 |
| | Aromatic polycarbonate resin (B-1) | 55 | 55 | 20 |
| | ABS resin (C-1) | 15 | 15 | 10 |
| | Flame retardant-1 (D-1) | 10 | 10 | 10 |
| | Flame retardant auxiliary-1(E-1) | 5 | | |
| | Flame retardant auxiliary-1(E-2) | | 5 | |
| | Flame retardant auxiliary-1(E-3) | | | 5 |
| | Hydrolysis inhibitor-1 | 1 | 1 | 1 |
| | Anti-dripping agent | 0.8 | 0.8 | 0.8 |
| Temperature of resin at cylinder and die head temperatures of 220° C. during kneading | | 231 | 231 | 230 |
| Surface state of the strand extruded under above condition | | Smooth | Slightly foamed | Foamed much |
| Temperature of resin at cylinder and die head temperatures of 200° C. during kneading | | 211 | 210 | 211 |
| Surface state of the strand extruded under above condition | | Smooth | Smooth | Foamed much |
| Temperature of resin at cylinder and die head temperatures of 180° C. during kneading | | 191 | 192 | 192 |
| Surface state of the strand extruded under above condition | | Smooth | Smooth | Smooth |
| Evaluation results | | | | |
| Cylinder and die head temperature of 220° C. | | | | |
| flame retardancy | UL94 flame retardancy V test (0.8 mm in thickness) | V-0 | V-0 | Evaluation not available |
| | UL94 flame retardancy 5VB test (1.6 mm in thickness) | 5VB | not-5VB | |
| Mechanical properties | Yield stress tensile strength (MPa) | 58 | 57 | |
| | Tensile elongation (%) at break | 14.7 | 8.8 | |
| | Charpy impact resistance strength (kJ/m$^2$) | 16.3 | 6.5 | |
| Cylinder and die head temperature of 200° C. | | | | |
| Flame retardancy | UL94 flame retardancy V test (0.8 mm in thickness) | V-0 | V-1 | Evaluation not available |
| | UL94 flame retardancy 5VB test (1.6 mm in thickness) | 5VB | 5VB | |
| Mechanical properties | Yield stress tensile strength (MPa) | 57 | 55 | |
| | Tensile elongation (%) at break | 8.6 | 7.1 | |
| | Charpy impact resistance strength (kJ/m$^2$) | 9.8 | 7.2 | |
| Cylinder and die head temperature of 180° C. | | | | |
| Flame retardancy | UL94 flame retardancy V test (0.8 mm in thickness) | V-0 | V-1 | V-1 |
| | UL94 flame retardancy 5VB test (1.6 mm in thickness) | 5VB | 5VB | 5VB |
| Mechanical properties | Yield stress tensile strength (MPa) | 52 | 51 | 51 |
| | Tensile elongation (%) at break | 3.2 | 2.6 | 2.4 |
| | Charpy impact resistance strength (kJ/m$^2$) | 6.5 | 4.8 | 6.2 |

TABLE 9

| Matrix resin | Resin 1 | Resin 2 | Resin 3 | Resin 4 | Resin 5 | Resin 6 |
|---|---|---|---|---|---|---|
| PC/ABS alloy resin (virgin material, "TN7300" manufactured by Teijin Chemicals Ltd.) | 100 | — | — | — | — | — |
| Collected PC/ABS alloy resin (product collected from the market, "TN7300" manufactured by Teijin Chemicals Ltd.) | — | 100 | — | — | — | — |
| ABS resin (virgin material, "ZFJ31" manufactured by UMGABS) | — | — | 100 | — | — | — |
| Collected ABS resin (product collected from the market, "ZFJ31", manufactured by UMGABS) | — | — | — | 100 | — | — |
| PC resin (virgin material, "AD5503" manufactured by Teijin Chemicals Ltd.) | — | — | — | — | 100 | — |
| Collected PC resin (product collected from the market, "AD5503", manufactured by Teijin Chemicals Ltd.) | — | — | — | — | — | 100 |
| UL-94 flame retardancy V/1.5 mm | V-1 | V-1 | V-2 | V-2 | not-V | not-V |
| UL-94 flame retardancy 5 V/1.5 mm | 5VB | not-5VB | not-5VB | not-5VB | not-5VB | not-5VB |
| Charpy impact resistance strength (kJ/m$^2$) 1.8" (23° C.) | 24.8 | 18.2 | 6.5 | 3.4 | 3 | 1.2 |
| MVR (250° C., 10 kgf, cm$^3$/10 min.) | 33 | 45 | 50 | 58 | 1.2 | 2.4 |

TABLE 10

| | Composition | Example 22 | Example 23 | Reference Example 1 | Example 24 | Reference Example 2 | Comparative Example 7 | Reference Example 3 | Comparative Example 8 |
|---|---|---|---|---|---|---|---|---|---|
| Composition | Polylactic acid resin (A-1) | 30 | 30 | 30 | 30 | 30 | 30 | 30 | 70 |
| | Resin 1 | 70 | | | | 70 | | | |
| | Resin 2 | | 70 | | | | 70 | | |

TABLE 10-continued

| | Composition | Example 22 | Example 23 | Reference Example 1 | Example 24 | Reference Example 2 | Comparative Example 7 | Reference Example 3 | Comparative Example 8 |
|---|---|---|---|---|---|---|---|---|---|
| | Resin 3 | | | 15 | | | | 15 | |
| | Resin 4 | | | | 15 | | | | 15 |
| | Resin 5 | | | 55 | | | | 55 | |
| | Resin 6 | | | | 55 | | | | 55 |
| | Flame retardant-1 (D-1) | 10 | 10 | 10 | 10 | | | | |
| | Flame retardant-4 (D-7) | | | | | 20 | 20 | 20 | 20 |
| | Flame retardant auxiliary-1 (E-1) | 5 | 5 | 5 | 5 | 5 | 5 | 5 | 5 |
| | Hydrolysis inhibitor-1 | 1 | 1 | 1 | 1 | 1 | 1 | 1 | 1 |
| | Anti-dripping agent | 0.4 | 0.4 | 0.8 | 0.8 | 0.4 | 0.4 | 0.8 | 0.8 |
| Evaluation results | | | | | | | | | |
| Flame retardancy | UL94 flame retardancy V test (0.8 mm in thickness) | V-0 | V-0 | V-0 | V-0 | V-0 | V-2 | V-0 | V-2 |
| | UL94 flame retardancy 5VB test (1.6 mm in thickness) | 5VB | 5VB | 5VB | 5VB | 5VB | not-5VB | 5VB | not-5VB |
| Heat resistance | DTUL (1.8 MPa) | 73 | 73 | 97 | 96 | 58 | 55 | 61 | 56 |
| Hydrolysis resistance evaluation at (80° C., 95%) | | | | | | | | | |
| 0 hr | | 100 | 100 | 100 | 100 | 100 | 100 | 100 | 100 |
| 100 hr | | 124 | 126 | 105 | 106 | 159 | 250 | 148 | 169 |
| 300 hr | | 138 | 139 | 117 | 119 | 212 | 387 | 201 | 250 |
| Mechanical properties | Yield stress tensile strength (MPa) | 59 | 58 | 62 | 61 | 54 | 52 | 57 | 55 |
| | Tensile elongation (%) at break | 9.8 | 9.7 | 14.5 | 14.2 | 5.5 | 3.2 | 4.2 | 2 |
| | Charpy impact resistance strength (kJ/m$^2$) | 11.0 | 10.5 | 8.7 | 8.1 | 2.4 | 1.3 | 3.2 | 1.1 |

The resin compositions of Examples 1 to 4, 5-1 to 5-9, 6, 7-1 to 7-2, and 8 to 19 are excellent in flame retardancy, heat resistance, and hydrolysis resistance in the case of forming a molded article, as compared with the resin compositions of Comparative Examples 1 to 6. Since the resin compositions of Examples 20 and 21 have lower expansion starting temperatures of the thermally expandable graphite that is a flame retardant auxiliary than that of Example 15, foaming occurs by heating during the kneading of the resin composition, and thus, the flame retardancy is slightly deteriorated in the case of forming a molded article, as compared with the resin composition of Example 15. The flame retardancy, the heat resistance, and the hydrolysis resistance are excellent in the case of forming a molded article even with the use of a styrene resin or polycarbonate resin collected from the market such as in the case of the resin compositions of Examples 23 and 24.

Furthermore, a master batch of the polylactic acid resin and each of the flame retardants for Examples and Comparative Examples in Tables 1 to 3, and a master batch of the aromatic polycarbonate resin and each of the flame retardants for Examples in Tables 6 and 7 are prepared at the blending ratios shown in Tables in advance, and then the other materials are mixed therewith at the blending ratios shown in Tables, thereby preparing test pieces for evaluation. For these, the respective measurements and evaluations are carried out, and as a result, the same results are obtained for the respective measurements and evaluations. Further, the specific order is as follows.

As for the Examples and Comparative Examples in Tables 1 to 3, the polylactic acid resin and the flame retardant are mixed as uniformly as possible by a tumbler. The mixture is melt-kneaded with a twin-screw extruder (TEX-30α, manufactured by The Japan Steel Works, Ltd.) equipped with a vent at each of a cylinder temperature and a die temperature of 220° C., a screw rotation number of 240 rpm, a vent suction degree of 100 MPa, and a discharge amount of 10 kg/h to obtain a pellet. Then, the obtained pellet is dried at 80° C. for 4 hours, using a hot-air drier, and then, the materials other than the polylactic acid resin and the flame retardant are further blended at the blending ratios shown in Tables 1 to 3, and mixed as uniformly as possible by a tumbler. The mixture is melt-kneaded with a twin-screw extruder (TEX-30α, manufactured by The Japan Steel Works, Ltd.) equipped with a vent at each of a cylinder temperature and a die temperature of 220° C., a screw rotation number of 240 rpm, a vent suction degree of 100 MPa, and a discharge amount of 10 kg/h to obtain a pellet. An injection molding machine (product name "NEX500", manufactured by Toshiba Machine Co., Ltd.) is used under the conditions of a cylinder temperature of 230° C. and a mold temperature of 60° C. to obtain a predetermined test piece for evaluation. For the Examples in Tables 6 and 7, in the same procedure except that the polylactic acid is replaced with an aromatic polycarbonate resin, a predetermined test piece for evaluation is obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising a polylactic acid resin, a polycarbonate resin, and/or styrene resin as a matrix resin, and surface-treated red phosphorous, wherein the surface-treated phosphorous is contained in an amount of 10 parts by weight to 40 parts by weight, based on 100 parts by weight of the polylactic acid resin or the polycarbonate resin, wherein a proportion of the red phosphorous of the surface-treated phosphorous is 50% by weight or more, wherein the surface-treated red phosphorous is a red phosphorous surface-treated with a compound having at least one of an isocyanate group, a mercapto group, a carboxyl group, a phosphoric acid group, a sulfonic acid group, and a sulfuric acid group, and wherein an average particle diameter of the surface-treated red phosphorous is 5 um or less.

2. The resin composition according to claim 1, wherein the surface-treated red phosphorus is contained in an amount of 12.5 parts by weight to 33.3 parts by weight, based on 100 parts by weight of the polylactic acid resin or the polycarbonate resin.

3. The resin composition according to claim 1, comprising a polylactic acid resin, a polycarbonate resin, and a styrene resin as a matrix resin, and a hydrolysis inhibitor.

4. The resin composition according to claim 1, further comprising thermally expandable graphite.

5. The resin composition according to claim 3, wherein the surface-treated red phosphorus is contained in an amount in the range of 1% by weight to 20% by weight, and the thermally expandable graphite is contained in an amount in the range of 0% by weight to 20% by weight, based on the total amount of the polylactic acid resin, the polycarbonate resin, the styrene resin, and the hydrolysis inhibitor.

6. The resin composition according to claim 1, wherein the surface-treated red phosphorous is red phosphorous surface-treated with a compound having an active hydrogen-containing group selected from an isocyanate and mercapto group.

7. The resin composition according to claim 1, wherein a proportion of the red phosphorus of the surface-treated red phosphorus is 90% by weight or more.

8. The resin composition according to claim 4, wherein a degree of expansion at 1000° C. of the thermally expandable graphite is more than 80 cc/g.

9. The resin composition according to claim 4, wherein an expansion starting temperature of the thermally expandable graphite is 230° C. or higher.

10. The resin composition according to claim 3, wherein the polycarbonate resin and the styrene resin are polycarbonate/styrene alloy resins.

11. A resin molded article comprising the resin composition according to claim 1.

12. Surface-treated red phosphorous for a resin molded article, which is surface-treated with a compound having at least one of an isocyanate group, a mercapto group, a carboxyl group, a phosphoric acid group, a sulfonic acid group, and a sulfuric acid group, wherein a proportion of the red phosphorous of the surface-treated phosphorous is 50% by weight or more, and wherein an average particle diameter of the surface-treated phosphorous is 5 um or less.

13. The surface-treated red phosphorus according to claim 12, wherein the compound is a compound having at least one active hydrogen-containing group selected from an isocyanate group and a mercapto group.

14. The surface-treated red phosphorus according to claim 12, wherein a proportion of the red phosphorus is 90% by weight or more.

* * * * *